Oct. 3, 1933.  M. VANDERKLOOT  1,928,917
MEAT MOLD
Filed June 18, 1931
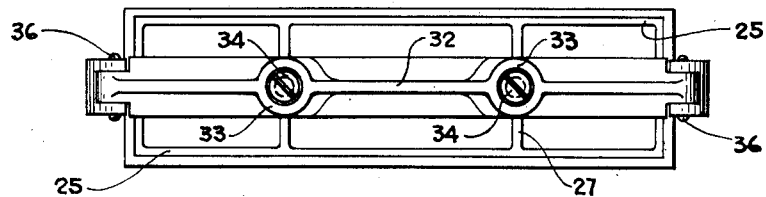
FIG-1
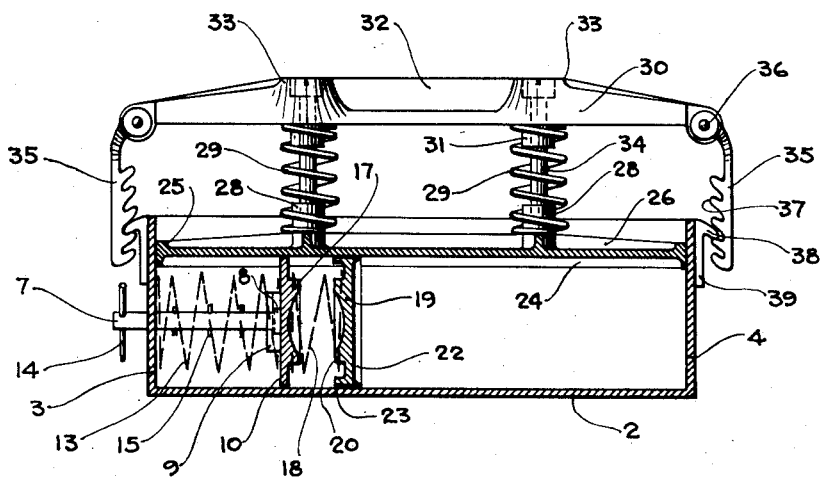
FIG-2
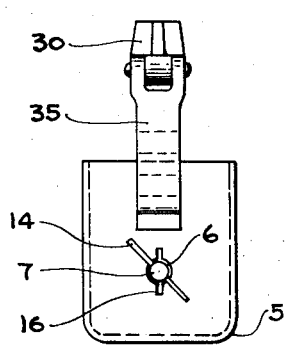
FIG-3
FIG-5
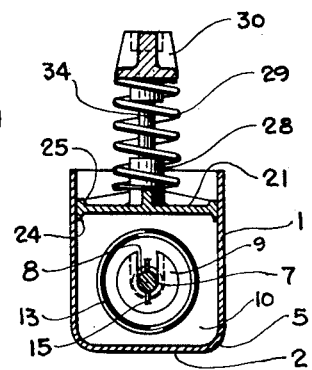
FIG-4
Marinus Vanderkloot
INVENTOR.
BY 
ATTORNEY.
WITNESS- Patented Oct. 3, 1933

1,928,917

UNITED STATES PATENT OFFICE 1,928,917

MEAT MOLD

Marinus Vanderkloot, Chicago, Ill., assignor, by mesne assignments, to Industrial Patents Corporation, Chicago, Ill., a corporation of Delaware Application June 18, 1931. Serial No. 545,176

9 Claims. (Cl. 100—57)

The invention relates to improvements in meat molds.

The object of the present invention is to improve the construction of meat molds and to provide a simple, practical and efficient meat mold equipped with top and end pressure plates adapted to apply spring pressure to the meat at the top and end to shape the meat into rectangular or elongated square form while the meat is being cooked or chilled.

A further object of the invention is to provide adjustable means for enabling the spring pressure on the end of the meat to be varied or adjusted and to equip the means for applying spring pressure to the end of the meat with an auxiliary or supplemental pressing plate adapted to exert spring pressure on the meat while the same is being introduced into the mold, to crowd or compact the meat preparatory to applying spring pressure to the top of the meat to press it into rectangular shape.

In the drawing:

Figure 1 is a plan view of a meat mold constructed in accordance with this invention.

Fig. 2 is a longitudinal sectional view of the same.

Fig. 3 is a front elevation of the meat mold.

Fig. 4 is a transverse sectional view of the same.

Fig. 5 is a perspective view of the end pressing plate shown in Figure 4.

In the accompanying drawing, in which is illustrated the preferred embodiment of the invention, 1 designates the body of the mold open at the top and constructed of sheet metal or other suitable material and composed of vertical side walls, a horizontal bottom wall 2 and vertical end walls 3 and 4, which may be either formed integral with the bottom and side walls or of separate pieces welded or otherwise secured to the bottom and side walls. The lower longitudinal corners of the mold are rounded at 5 at the juncture of the bottom and side walls to facilitate cleaning the mold. The end wall 3 is provided with an opening 6 through which passes a shaft 7 provided at its inner end with an annular flange or head 8 which is arranged in a bearing collar 9 secured to the outer face of a main end pressing plate 10 by rivets or other suitable fastening devices and provided with a vertical slot 11 and flanged at the marginal edges of the slot to provide a bearing recess 12 to receive the head of the shaft 7. The slot 11 extends downwardly from the top of the bearing collar and is provided with a semi-circular lower end wall to form a bearing for the inner end of the shaft. The slot of the bearing collar enables the head of the shaft to be readily introduced into the bearing collar and removed therefrom.

A main horizontal coiled spring 13 is interposed between the main end pressing plate and the end wall 3, and is adapted to be compressed by drawing the shaft 7 outwardly. The shaft, which passes through the main horizontal spring 13, is provided at its outer end with a suitable handle 14 preferably consisting of a tapered pin inserted in a transverse opening in the outer end of the shaft. The handle is adapted to be grasped to permit the shaft and the main end pressing plate to be drawn outwardly to compress the spring 13 and the latter is maintained in a compressed condition by one of a plurality of pin latches 15 arranged at intervals and consisting of transversely disposed pins inserted in transverse perforations of the shaft 7 and projecting laterally from opposite sides thereof. The pins are adapted to be drawn outwardly through opposite recesses or extensions 16 of the opening 6 in the end wall 3 of the mold. The opening 6 and the opposite recesses 16 form a passageway for the pin latches, and after one or more of the pin latches have been drawn outwardly through such passageway, the shaft is partially rotated to carry the pin latches out of alignment with the recesses 16 to prevent the return of the shaft under the action of the compressed spring 13. The pin latch which engages the outer face of the end wall 3 will hold the spring in its compressed condition, and by drawing one or more of the pin latches outwardly through the said passageway, the spring 13 may be compressed to a greater or less degree, as required or desired. When the shaft is partially rotated to carry the pin latches into alignment with the recesses 16, the spring 13 will act to force the main end pressing plate inwardly to apply pressure to the meat.

The main end pressing plate is provided at its inner face with an annular rib 17 forming a centering boss for the outer end of an auxiliary spring 18 which is interposed between the main end pressing plate and an auxiliary end pressing plate 19. The auxiliary end pressing plate is provided at its outer face with an annular rib 20 forming an annular boss for centering the inner end of the auxiliary spring 18 on the auxiliary end pressing plate. The ends of the auxiliary spring may be secured to the end plates in any desired manner, or the ends of the auxiliary spring may be simply arranged on the annular ribs 17 and 20 and removably fitted against the end pressing plates 10 and 19.

The end pressing plates are rounded at the corners to conform to the configuration of the body of the mold and also the lower face of the top pressing plate 21. The auxiliary end pressing plate, which engages the end of the meat, has a cup shaped inner face 22 and it is provided at its periphery with a marginal flange 23 extending longitudinally of the mold and forming an extended bearing surface entirely around the auxiliary end plate to enable the latter to slide readily on the side and bottom walls of the body of the mold and the lower face of the top pressing plate.

When the main end pressing plate is drawn outwardly to compress the main horizontal coiled spring 13, the auxiliary spring and the auxiliary end pressing plate are drawn outwardly without compressing the auxiliary spring, and when the main end pressing plate is latched in its outward adjustment, the meat is introduced into the mold through the open top thereof and it is acted on by the auxiliary end pressing plate, which, through the action of its spring, will tend to crowd or compact the meat as the same is introduced into the mold. This will facilitate the placing of the meat in the mold and the obtaining of a substantially uniform density of the same prior to applying the meat shaping pressure.

The top pressing plate, which extends the entire length of the mold and entirely across the same, is provided with a cup-shaped lower face 24, and it is reinforced at its upper face by a marginal flange 25, a central longitudinal rib 26, and spaced transverse ribs 27. The marginal flange, which extends entirely around the side and end edges of the top pressing plate, provides a bearing surface to facilitate the sliding of the top pressing plate on the inner faces of the walls of the mold. The pressing plate is provided at the junction of the longitudinal and transverse ribs with vertical tubes 28 preferably formed integral with the top pressing plate, but the tubes may be constructed in any other desired manner and may be welded or otherwise secured to the top pressing plate. The top pressing plate rests upon the main and auxiliary end pressing plates, which conform to the configuration of the cup shaped lower face of the top pressing plate and support the top pressing plate at spaced points.

The upwardly extending tubes of the top pressing plate center the lower ends of vertical coiled springs 29 interposed between the top pressing plate and the locking bar 30 which is provided with depending annular bosses 31 for centering the upper ends of the coiled springs 29. The locking bar is reinforced at the upper face by a longitudinal rib 32 provided at spaced points with annular enlargements 33 arranged in alignment with the depending annular bosses and disposed concentric with the same and countersunk to receive the upper headed ends of vertical screws or bolts 34. The screws or bolts 34 pass through the locking bar and through the depending annular bosses thereof and extend into the vertical tubes 28 of the top pressing plate. The lower ends of the screws or bolts 34 are threaded into the top pressing plate and they form guides for the relative movement of the pressing plate and the locking bar, which is adjustably connected at its ends with the mold by hook bars 35. The hook bars 35, which are hinged at their upper ends to the ends of the locking bar by suitable pintles 36, are provided at their inner faces with a longitudinal series of teeth 37 adapted to engage a bill or tooth 38 of end hooks 39 welded or otherwise secured to the ends 3 and 4 of the mold at the top thereof, as clearly illustrated in Fig. 2 of the drawing. The teeth of the hook bars form a ratchet connection with the end hooks of the body of the mold, and are adapted to permit an adjustment of the locking bar to control the tension of the springs and produce the desired spring pressure on the top of the meat, and the said hook bars readily spring into and out of engagement with the end hooks in the adjustment of the locking bar.

Previous to placing the meat in the mold, the end spring 13 is fully compressed, unless a less pressure is desired, and is secured in its compressed condition by the pin latches 15. The product is then introduced into the mold and is acted on by the auxiliary end pressing plate and the auxiliary spring to compact the product in the mold. The product is then pressed into rectangular shape by first applying the pressure of the top pressing plate, which presses firmly against the top of the meat. The shaft is then turned to release the main horizontal spring 13 and subject the meat to the action thereof, so that the meat is under direct spring pressure from both the top and end.

The meat when cooked or chilled assumes a rectangular shape, the cross section or thickness of which is fixed by the height of the end plates and the spring pressure upon the top and ends of the meat. The height and length of the finished product is dependent upon the weight of the piece of meat and the spring pressure. The spring pressure from the end may be regulated by means of the pin latches. The advantage of top pressing is the maintaining and concentrating of the grain of the piece of meat in one direction.

What is claimed is:

1. A meat mold of the class described comprising a mold open at the top, an end pressing plate arranged within the mold, a spring for urging the end plate inwardly to exert pressure on the end of the meat, a shaft connected with the end plate and adapted to draw the same outwardly to compress the spring, means for adjustably securing the shaft for controlling the tension of the spring, a top pressing plate, and means for applying yielding pressure to the same.

2. A meat mold of the class described comprising a body open at the top and having side, bottom and end walls, one of the end walls being provided with an opening and having a recess extending from the opening, an end pressing plate arranged within the mold, a spring interposed between the end pressing plate and the end wall having the said opening, a shaft connected with the end pressing plate and extending through the said opening and provided at intervals with pin latches adapted to pass through the said recess and capable of engaging the end wall when the shaft is partially rotated to hold the spring in a compressed condition and the end wall in an adjusted position, a top pressing plate, and means for exerting pressure on the top pressing plate.

3. A meat mold of the class described comprising a body open at the top, an end pressing plate arranged within the body and provided with a bearing collar having a bearing and provided with a slot forming an entrance to the bearing, a shaft having a head detachably arranged in the bearing, a spring disposed around the shaft and engaging the end pressing plate for urging the same inwardly and exerting pressure on the meat, said shaft being slidable and rotatable and adapted to be drawn outwardly for compressing the spring, means operated by the rotary movement of the shaft for locking and releasing the same, a top pressing plate, and means for exerting pressure on the top pressing plate.

4. A meat mold of the class described, comprising a body open at the top, a top pressing plate located within the upstanding peripheral walls of the mold, adjustable means for exerting spring pressure on the top pressing plate, an end pressing plate arranged within the mold below the top pressing plate and supporting the latter, and adjustable means comprising springs for exerting inward pressure on the end plate.

5. A meat mold of the class described comprising a body open at the top, a top pressing plate, means for exerting pressure on the top pressing plate, a main end pressing plate, means connected with the same for exerting pressure on the meat, an auxiliary end pressing plate, and a spring interposed between the main and auxiliary pressing plates.

6. A meat mold of the class described comprising a body open at the top, a top pressing plate, means for exerting pressure on the top pressing plate, a main end pressing plate arranged within the body below the top pressing plate, a spring for urging the main end pressing plate inwardly for exerting pressure on the meat, an auxiliary end pressing plate spaced from the main end pressing plate, a coiled spring interposed between the main and auxiliary end pressing plates, and means for adjusting the tension of the spring of the main end pressing plate without affecting the tension of the spring between the main and auxiliary end pressing plates.

7. A meat mold of the class described comprising a body open at the top, a top pressing plate, means for exerting pressure on the top pressing plate, a main end pressing plate arranged within the body below the top pressing plate, a spring for urging the main end pressing plate inwardly for exerting pressure on the meat, an auxiliary end pressing plate spaced from the main end pressing plate, a coiled spring interposed between the main and auxiliary end pressing plates, and means for adjusting the tension of the spring of the main end pressing plate without affecting the tension of the spring between the main and auxiliary end pressing plates, said main and auxiliary end pressing plates forming spaced supports for and receiving the top pressing plate.

8. A meat mold of the class described, comprising a body open at the top and having side, bottom and end walls, spaced main and auxiliary end pressing plates arranged within the body, the auxiliary end pressing plate being provided with a marginal flange forming bearing surfaces at the edges of the said auxiliary plate, an auxiliary spring interposed between the main and auxiliary end pressing plates, a main spring for urging the main end pressing plate inwardly, adjustable means connected with the main end pressing plate for compressing the spring and for holding the same in a compressed condition, a top pressing plate located above and supported by the main and auxiliary end pressing plates, and means for applying pressure to the top pressing plate.

9. A meat mold of the class described comprising a mold open at the top, an end pressing plate arranged within the mold, a spring for urging the end plate inwardly to exert pressure on the end of the meat, means connected with the end plate for moving the same outwardly to compress the spring and for holding the end plate in different positions to control the tension of the spring, restrain inward movement of the end plate and permit yielding outward movement of the end plate against the spring pressure, a top pressing plate located within the upstanding peripheral walls of the mold, and means for exerting yielding downward pressure on the top pressing plate.

MARINUS VANDERKLOOT.